United States Patent [19]

Labaquere

[11] 4,304,671
[45] Dec. 8, 1981

[54] APPARATUS AND PROCESS FOR SEPARATING EMULSIONS BY COALESCENCE

[75] Inventor: Hervé Labaquere, Le Pecq, France

[73] Assignee: Degremont, Hauts de Seine, France

[21] Appl. No.: 78,286

[22] Filed: Sep. 24, 1979

[30] Foreign Application Priority Data

Oct. 2, 1978 [FR] France .............................. 78 28058

[51] Int. Cl.³ ............................................ B01D 13/00
[52] U.S. Cl. .................................... 210/636; 210/649; 210/799; 210/307; 210/310
[58] Field of Search ............. 210/311, 310, 456, 23 R, 210/301, 305, DIG. 5, 307, 636, 649, 799

[56] References Cited

U.S. PATENT DOCUMENTS 3,558,482  1/1971  Young .................................. 210/23
3,948,767  4/1976  Chapman ..................... 210/DIG. 5

FOREIGN PATENT DOCUMENTS 548295  3/1977  U.S.S.R. ......................... 210/DIG. 5
579229  11/1977  U.S.S.R. ............................ 210/23 R
617377  7/1978  U.S.S.R. ............................ 210/23 R

*Primary Examiner*—Frank A. Spear, Jr.

*Attorney, Agent, or Firm*—Wenderoth, Lind & Ponack

[57] ABSTRACT

A system for treating organic emulsions by separating by coalescence the disperse phase from the dispersion phase of the emulsion includes a single enclosed chamber having therein a lower destabilizing area, a central filtering and coalescence area, and an upper flotation and separation area. An emulsion to be treated is continuously introduced and passed upwardly through the destabilizing area, the filtering and coalescence area and the flotation and separation area. The flotation and separation area includes a center portion positioned vertically above the filtering and coalescence area and at least one lateral portion in flow communication with the center portion and extending laterally downwardly along a side of the filtering and coalescence area and the destabilizing area. The lateral portion of the flotation and separation area is laterally separated from the filtering and coalescence area and from the destabilizing area by a partition. The disperse phase of the emulsion is withdrawn by a first withdrawal means from upper portions of the center and lateral portions of the flotation and separation area. The dispersion phase is withdrawn by second withdrawal means separate from the first withdrawal means from the lower part of the lateral portion of the flotation and separation area.

15 Claims, 3 Drawing Figures

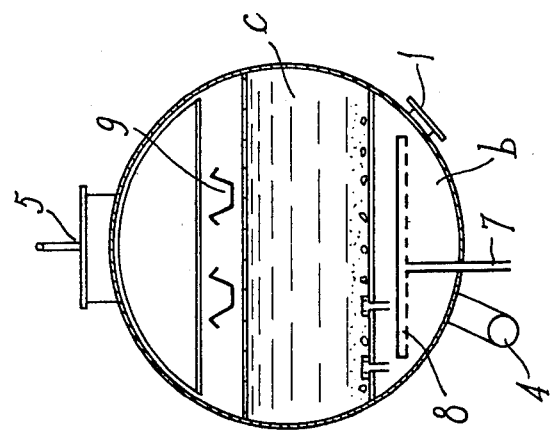
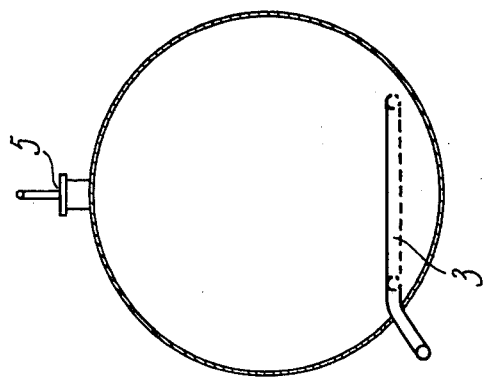

APPARATUS AND PROCESS FOR SEPARATING EMULSIONS BY COALESCENCE

BACKGROUND OF THE INVENTION

The present invention relates to an apparatus and a process for separating, by coalescence, the disperse phase of an emulsion from the dispersion phase of the emulsion.

More particularly, the present invention is directed to an improvement of the invention disclosed in U.S. patent application Ser. No. 890,664, filed Mar. 27, 1978, owned by the Assignee of the present application, now abandoned.

The invention disclosed in U.S. application Ser. No. 890,664, filed Mar. 27, 1978, discloses a process and an apparatus for separation by coalescence of the disperse phase from the dispersion phase of an organic emulsion, wherein an emulsion to be treated is passed successively upwardly through three zones superposed above one another in a single chamber. Raw water containing a preliminarily destabilized emulsion is passed continuously upwardly through a lower destabilizing area, whereat the emulsion is destabilized and caused to flow uniformly toward the filtering and coalescence area. The thus destabilized emulsion is then continuously passed upwardly through the filtering and coalescence area, which contains coalescence material, whereat the disperse phase of the emulsion is attracted in droplet form to the coalescence material such that the droplets grow in size by coalescence during upward passage of the emulsion through the filtering and coalescence area. The thus coalesced emulsion is then continuously passed upwardly into the flotation and separation area, whereat the coalesced droplets of disperse phase separate by flotation from the dispersion phase of the emulsion. The disperse phase and dispersion phase are then withdrawn by separate withdrawal mean from the chamber.

Periodic cleaning of the coalescence material is accomplished automatically as a function of the degree of retention thereby of matter in suspension filtered out from the emulsion. Cleaning includes a washing operation involving passing washing liquid and gas upwardly through the destabilizing area and the filtering and coalescence area, followed by a rinsing operation involving passing cleaning liquid only upwardly through the destabilizing area and the filtering and coalescence area. The washing and rinsing liquid is withdrawn from the chamber at a level above the coalescence material but below the flotation and separation area.

In the process and apparatus of U.S. application Ser. No. 890,664, filed Mar. 27, 1978, the flotation area is disposed above the filtering and coalescence area, with the area of separation between the disperse and dispersion phases of the emulsion having a surface area equal to that of the coalescence area. Therefore, if the liquid, for example water, has a very high degree of pollution, that is if the emulsion to be treated has a high level of disperse phase, the flotation surface area may be inadequate, with the result that the flotation area will become rapidly saturated with the disperse phase. For example, if the emulsion to be treated is an oil-water emulsion, and if the emulsion contains a high level of oil, then the surface area of the flotation area may be insufficient to accommodate a given flow of emulsion to be treated, with the result that the flotation area will become rapidly saturated with the disperse phase, i.e. oil.

In order to effectively treat desired emulsion flow rates having a high degree of pollution or disperse phase, it has been necessary to construct systems according to U.S. application Ser. No. 890,664, filed Mar. 27, 1978, as high as seven meters and having a floor load as great as eight tons per square meter. It will be apparent that such undesirably great heights and resultant great floor loads will present a considerable number of difficulties in utilization of the system, particularly on installations such as offshore platforms.

Additionally, it is known to use horizontal filtration and coalescence devices wherein the emulsion to be treated is percolated either vertically upwardly or crosswise. Such known devices however have various disadvantages. Such percolation filter devices having vertically upward flow do not satisfactorily prevent the disperse phase from being entrained in the dispersion phase, i.e. free oil becomes entrained to an unacceptable extent in the treated water. Such known crosswise or sidewise percolation filters are extremely difficult to satisfactorily clean.

SUMMARY OF THE INVENTION

With the above discussion in mind, it is the primary object of the present invention to provide an improved apparatus and process of the type disclosed in U.S. application Ser. No. 890,664, filed Mar. 27, 1978, but whereby the flotation capacity is increased without increasing the overall height of the system.

Accordingly, the disclosure of U.S. application Ser. No. 890,664, filed Mar. 27, 1978, is hereby incorporated by reference.

The above object is achieved in accordance with the present invention by the provision of an apparatus and a process similar to that disclosed in U.S. application Ser. No. 890,664, filed Mar. 27, 1978. However, in accordance with the present invention, the upper flotation and separation area includes a center portion positioned vertically above the filtering and coalescence area and at least one lateral portion in flow communication with the center portion and extending laterally downwardly along a side of the filtering and coalescence area and the destabilizing area. The lateral portion of the flotation and separation area is laterally separated from the filtering and separation area and from the destabilizing area by a partition. The emulsion, coalesced in the filtering and coalescence area, is passed upwardly into the center portion and laterally into the at least one lateral portion of the flotation and separation area, and therein the coalesced droplets of disperse phase separate from and float on the dispersion phase. The coalesced disperse phase is withdrawn by first withdrawal means from the center and lateral portions of the flotation and separation area. The dispersion phase is withdrawn by second withdrawal means, separate from the first withdrawal means, from the bottom of the at least one lateral portion only of the flotation and separation area.

By the above features, the surface area of the flotation zone or area is substantially increased, without increasing the height of the system. Thereby, the improved system of the present invention enables the treatment of emulsions having a high degree of pollution, i.e. emulsions having a high level of disperse phase, without reducing the flow of the emulsion through the system.

BRIEF DESCRIPTION OF THE DRAWINGS

Other objects, features and advantages of the invention will be apparent from the following detailed description, taken with the accompanying drawings, wherein:

FIG. 2 is a schematic transverse section taken along line II—II of FIG. 1; and

FIG. 3 is a schematic transverse cross section taken along line III—III of FIG. 1.

DETAILED DESCRIPTION OF THE INVENTION

Figure 1:
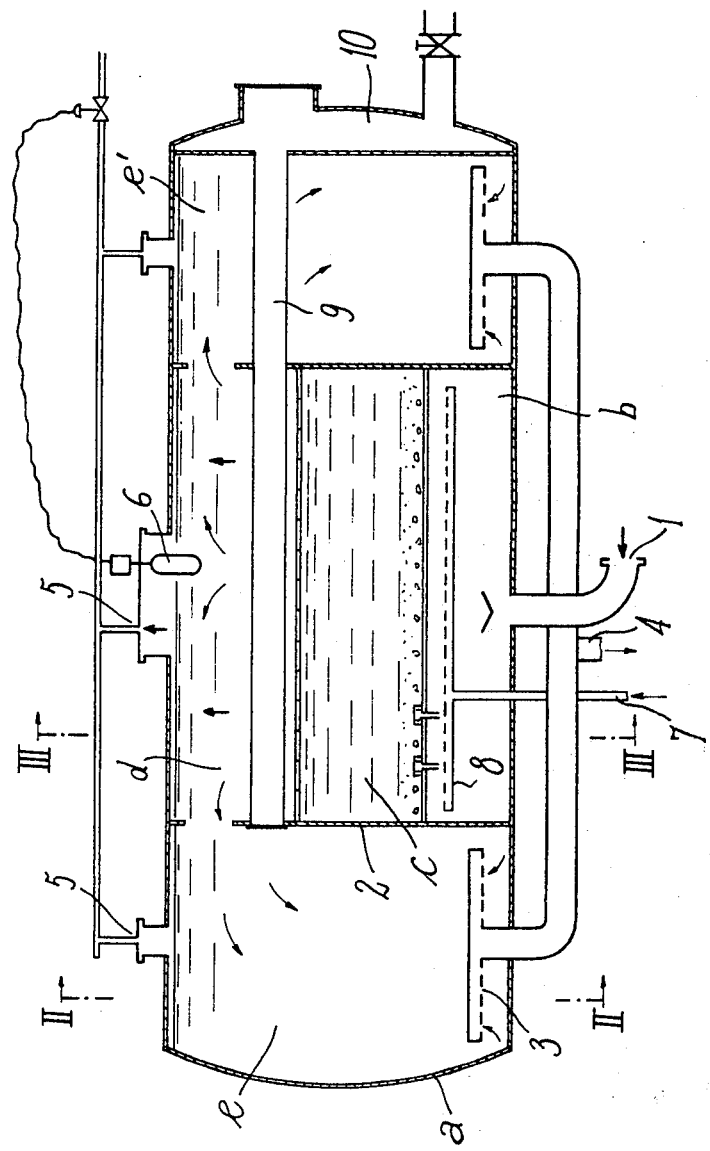
FIG. 1 is a schematic vertical section through a device in accordance with an embodiment of the present invention.

The following description will deal with a specific apparatus and process which are within the scope of the present invention. It is however to be understood that the invention is not limited to the specific shapes, structures, proportions or arrangements described but that the invention is intended to encompass modifications thereof without departing from the scope of the invention.

It is further to be understood that although the present invention is particularly applicable to the treatment of oily emulsions such as oil-field water, condensates appearing during the operation in the petroleum industry and to emulsions used in various mining industries for the treatment of ore, for example copper or uranium ore, it will be apparent from the following discussion that the process and apparatus of the present invention are applicable to the separation of a wide variety of organic emulsions.

The apparatus of the invention includes an enclosed container or chamber a which in the illustrated embodiment is a substantially horizontally extending cylinder. Positioned within the chamber a, between opposite horizontal ends thereof, are a lower destabilizing area b and immediately thereabove a central filtering and coalescence area c. In accordance with the present invention there is provided within the chamber a an upper flotation and separation area including a center portion d positioned vertically above the filtering and coalescence area c and a pair of lateral portions e and e' which are in flow communication with center portion d and which extend laterally thereof and then laterally downwardly along respective sides of the filtering and coalescence area c and the destabilizing area b. The lateral portions e and e' are separated from the filtering and coalescence area c and from the destabilizing area b by respective substantially vertically extending partitions 2 which extend upwardly to a level above the upper level of filtering and coalescence material provided within the filtering and coalescence area c. The filtering and coalescence material may be any known such material, for example that disclosed in U.S. application Ser. No. 890,664, filed Mar. 27, 1978. Flow communication between center portion d and lateral portions e and e' is provided by openings in the upper portions of partitions 2.

A preliminarily conditioned, for example preliminarily destabilized, emulsion to be treated is introduced through piping 1 at the bottom of chamber a into the destabilizing area b. Destabilizing area b may be similar to that disclosed in U.S. application Ser. No. 890,664, filed Mar. 27, 1978, and destabilization of the emulsion and a uniformly upward flow of the emulsion occur therein in a similar manner. The thus destabilized emulsion is then passed continuously upwardly into the filtering and coalescence area, therein causing the disperse phase of the emulsion to be attracted to the coalescence material in the form of droplets. The emulsion continues to pass upwardly through the filtering and coalescence area such that the droplets of the disperse phase grow in size by coalescence during such upward passage, and the coalescence material filters out matter in suspension from the emulsion during such upward passage. This forms a filtered and coalesced emulsion including a filtered dispersion phase, for example water, and coalseced droplets of disperse phase, for example oil. The thus filtered and coalesced emulsion is then passed upwardly into center portion d and laterally into lateral portions e and e' of the flotation and separation area. Therein, the coalesced droplets of disperse phase are caused to separate from and float on the filtered dispersion phase.

The coalesced disperse phase is withdrawn from the upper portions of the center portion d and the lateral portions e and e' of the flotation and separation area by means of first withdrawal means, in the form of piping system 5. The interface between the disperse and dispersion phases, for example a water-oil interface, may be detected by a conventional detector 6 to permit automatic extraction of the disperse phase by piping system 5.

The dispersion phase, for example water, is withdrawn by means of second withdrawal means, separate from the first withdrawal means, from the bottom portions of the lateral portions e and e' of the flotation and separation area. In the illustrated embodiment, the second withdrawal means is in the form of collectors 3 located in the lower parts of the lateral portions e and e', and a collector piping system 4 connected to the collectors 3. An advantage of this arrangement is that the withdrawal means 3, 4 act to maintain an equilibrium of flow of the dispersion phase through the lateral portions e and e'.

In accordance with the present invention, it is possible to conduct a coalescence material washing operation to remove matter in suspension from the coalescence material within the filtering and coalescence area c, in a manner similar to that disclosed in U.S. application Ser. No. 890,664, filed Mar. 27, 1978. Thus, in accordance with the present invention, the normal treatment operation of the system may be interrupted, and then a washing operation may be initiated by passing washing liquid through piping 1 into destabilizing area b and upwardly through the filtering and coalescence material in filtering and coalescence area c. Simultaneously, gas may be introduced through a line 7. The washing liquid and the matter in suspension removed thereby may be collected in substantially horizontally extending troughs 9 positioned above the upper level of the filtering and coalescence material but below the center portion d of the flotation and separation area. The washing liquid and matter in suspension removed thereby may then be passed to a collection compartment 10 and may be then recycled to another portion of the overall installation or discharged to a drain. After the washing operation, rinsing liquid only may be introduced through piping 1 into the destabilization area b and then passed upwardly through the filtering and coalescence material within the filtering and coalescence area c and thereafter collected in troughs 9 and compartment 10.

In accordance with the present invention the washing and rinsing liquids may be the same type of materials disclosed in U.S. application Ser. No. 890,664, filed Mar. 27, 1978. Such washing and rinsing liquids may comprise initial emulsion to be treated. Alternatively, such washing and rinsing liquids may comprise treated water stored in lateral portions e and e' and discharged therefrom via piping 4 to piping 1. It will be apparent that in accordance with the present invention, treated emulsion may be readily stored in lateral portions e and e' during the washing and rinsing operation, without danger of contamination of the treated emulsion by the washing and rinsing liquid. This is due to the fact that flow communication between center portion d and the lateral portions is above the level of the collecting troughs 9, and that collecting troughs 9 are positioned below the level of the center portion d.

It will be apparent from the above discussion that in accordance with the present invention the flotation surface area of the flotation and separation zone or area is greatly increased over that of the system disclosed in U.S. application Ser. No. 890,664, filed Mar. 27, 1978. Specifically, the surface area of the flotation zone may easily be made to be double the surface area of the coalescence zone. This makes it possible to treat emulsions containing a very high proportion of disperse phase, for example oil. Specifically, it is possible to treat oil-water emulsions including up to from five to ten percent oil. In such a system, the height of the device may be no more than four meters, with the floor load being approximately four tons per square meter.

More specifically, a device according to the present invention, having a diameter of four meters, a length of ten meters, a filtration surface area of twenty square meters and a water feed rate of eight hundred cubic meters per hour has achieved the same results as a device such as disclosed in U.S. application Ser. No. 890,664, filed Mar. 27, 1978, but having a much higher height and floor load.

Although the present invention has been described and illustrated with respect to certain specific preferred features, it is to be understood that various modifications may be made without departing from the scope of the present invention. Thus, although the present invention has been described and illustrated with respect to two lateral portions e and e', the present invention is equally applicable to an arrangement having a single lateral portion or to more than two lateral portions. Further, the coalescence material washing operation may be automatically initiated in the present invention by means similar to that disclosed in U.S. application Ser. No. 890,664, filed Mar. 27, 1978. All features of the present invention, other than the obvious novel features thereof, may be provided in accordance with the teachings of U.S. application Ser. No. 890,664, filed Mar. 27, 1978.

What I claim is:

1. An apparatus for treating organic emulsions by separating by coalescence the disperse phase from the dispersion phase of the emulsion, said apparatus comprising:
    a single enclosed chamber having therein a lower destabilizing area, a central filtering and coalescence area, and an upper flotation and separation area;
    means for introducing an emulsion to be treated into said lower destabilizing area such that said emulsion passes successively upwardly through said destabilizing area, whereat said emulsion is destabilized and caused to flow uniformly upwardly, said filtering and coalescence area, and said flotation and separation area;
    filtering and coalescence material, positioned in said filtering and coalescence area, for filtering out matter in suspension from said emulsion and for attracting the disperse phase of said emulsion in droplet from such that the droplets grow in size during upward passage of said emulsion through said filtering and coalescence area;
    said flotation and separation area including a center portion positioned vertically above said filtering and coalescence area and at least one lateral portion in flow communication with said center portion and extending laterally downwardly along a side of said filtering and coalescence area and said destabilizing area;
    said lateral portion of said flotation and separation area being laterally separated from said filtering and coalescence area and from said destabilizing area by a partition;
    the coalesced droplets of disperse phase separating from and floating on the dispersion phase of said emulsion within said center and lateral portions of said flotation and separation area;
    first withdrawal means for withdrawing said coalesced disperse phase from said center and lateral portions of said flotation and separation area; and
    second withdrawal means, separate from said first withdrawal means, for withdrawing said dispersion phase from said lateral portion of said flotation and separation area.

2. An apparatus as claimed in claim 1, further comprising means for injecting washing and rinsing means into said destabilizing area and then upwardly through said filtering and coalescence material to remove therefrom said matter in suspension, and at least one substantially horizontally extending trough positioned above the upper level of said filtering and coalescence material but below said center portion of said flotation and separation area, for collecting said washing and rinsing means, with said removed matter in suspension therein, and for removing the thus collected washing and rinsing means and matter in suspension from said chamber.

3. An apparatus as claimed in claim 1, wherein said first withdrawal means comprises a piping system connected to uppermost locations of said center and lateral portions of said flotation and separation area.

4. An apparatus as claimed in claim 1, wherein said second withdrawal means comprises collecting means located at the bottom of said lateral portion of said flotation and separation area, and a pipe system extending from said collecting means outwardly through the bottom of said chamber.

5. An apparatus as claimed in claim 1, comprising plural separate said lateral portions of said flotation and separation area located laterally adjacent plural respective sides of said filtering and coalescence area and said destabilizing area, and plural said partitions, each said partition laterally separating a respective one of said lateral portions from said filtering and coalescence area and from said destabilizing area.

6. An apparatus as claimed in claim 5, wherein said chamber comprises a substantially horizontally extending cylinder having axially horizontally spaced end sections and a central section separating said end sections, said partitions separating said central section from said end sections, said filtering and coalescence area, said destabilizing area and said center portion of said flotation and separation area being located in said central section, and said lateral portions of said flotation and separation area being located in said end sections.

7. An apparatus as claimed in claim 5, wherein said second withdrawal means comprises a piping system connected to lowermost parts of said plural lateral portions of said flotation and separation area, said piping system comprising means for maintaining equilibrium of flow through said plural lateral portions.

8. A process for treating organic emulsions including separating by coalescence the disperse phase from the dispersion phase of the emulsion, said process comprising:

providing within a single enclosed chamber a lower destabilizing area, a central filtering and coalescence area containing therein coalescence material, and an upper flotation and separation area including a center portion positioned vertically above said filtering and coalescence area and at least one lateral portion in flow communication with said center portion and extending laterally downwardly along a side of said filtering and coalescence area and said destabilizing area; and conducting a coalescence treatment operation comprising:

introducing an emulsion to be treated into said lower destabilizing area and therein destabilizing said emulsion to form a destabilized emulsion;

passing said destabilized emulsion upwardly into said filtering and coalescence area and therein causing the disperse phase of said emulsion to be attracted to said coalescence material in the form of droplets, and continuing to pass said emulsion upwardly through said filtering and coalescence area such that said droplets of disperse phase grow in size by coalescence during such upward passage, said coalescence material filtering out matter in suspension from said emulsion during such upward passage, to thereby form a filtered and coalesced emulsion including a filtered dispersion phase and coalesced droplets of said disperse phase;

passing said filtered and coalesced emulsion upwardly into said center portion and laterally into said at least one lateral portion of said flotation and separation area and therein causing said coalesced droplets of disperse phase to separate from and float on said filtered dispersion phase;

withdrawing said coalesced disperse phase by means of first withdrawal means from said center and lateral portions of said flotation and separation area; and withdrawing said dispersion phase, by means of second withdrawal means separate from said first withdrawal means, from said at least one lateral portion only of said flotation and separation area.

9. A process as claimed in claim 8, further comprising conducting a coalescence material washing operation including injecting washing and rinsing means into said destabilizing area and then upwardly through said coalescence material to remove therefrom said matter in suspension, collecting said washing and rinsing means, with said removed matter in suspension therein, in at least one substantially horizontally extending trough at a position above the upper level of said coalescence material but below said center portion of said flotation and separation area and removing the thus collected washing and rinsing means and matter in suspension from said chamber.

10. A process as claimed in claim 9, further comprising, during said coalescence material washing operation, storing said filtered dispersion phase in said at least one lateral portion of said flotation and separation area.

11. A process as claimed in claim 10, further comprising employing the thus stored filtered dispersion phase at least partially as said washing and rinsing means.

12. A process as claimed in claim 8, comprising withdrawing said coalesced disperse phase via a piping system from uppermost portions of said center and lateral portions of said flotation and separation area.

13. A process as claimed in claim 8, comprising withdrawing said dispersion phase from the bottom of said at least one lateral portion only of said flotation and separation area.

14. A process as claimed in claim 8, comprising passing said filtered and coalesced emulsion laterally into plural separate said lateral portions of said flotation and separation area located laterally adjacent plural respective sides of said filtering and coalescence area and said destabilizing area.

15. A process as claimed in claim 14, comprising withdrawing said dispersion phase simultaneously from lowermost parts of said plural lateral portions of said flotation and separation area, and thereby maintaining equilibrium of flow of said dispersion phase through said plural lateral portions.

* * * * *